United States Patent [19]

Shabtai et al.

[11] Patent Number: 4,579,832

[45] Date of Patent: Apr. 1, 1986

[54] CLASS OF HYDROPROCESSING CATALYSTS AND PREPARATION METHODS

[75] Inventors: Joseph Shabtai; Jerzy Fijal, both of Salt Lake City, Utah

[73] Assignee: University of Utah, Salt Lake City, Utah

[21] Appl. No.: 659,356

[22] Filed: Oct. 10, 1984

[51] Int. Cl.$^4$ .............................................. B01J 21/16
[52] U.S. Cl. ...................................................... 502/84
[58] Field of Search .............................. 502/84, 80, 63

[56] References Cited

U.S. PATENT DOCUMENTS

| | | | |
|---|---|---|---|
| 3,844,979 | 10/1974 | Hickson | 502/84 X |
| 4,238,364 | 12/1980 | Shabtai | 502/65 |
| 4,436,832 | 3/1984 | Jacobs et al. | 502/84 |
| 4,452,910 | 6/1984 | Hopkins et al. | 502/84 |

Primary Examiner—Carl F. Dees
Attorney, Agent, or Firm—J. Winslow Young

[57] ABSTRACT

A novel hydroprocessing catalyst comprising a cross-linked smectite as framework material and containing catalytically active transition metal derivatives permanently incorporated in specific forms as interlamellar components of the cross-linked smectite structure. Suitable cross-linked smectites include cross-linked forms of montmorillonite, beidellite, hectorite, synthetic fluorhectorite and other members of the smectite mineral group. The catalytically active transition metal derivatives include different combinations of incorporated hydroxy-M and oxo-M oligomers and oligomeric cations (where M=molybdenum, chromium, nickel, cobalt, tungsten or other transition metals), and mononuclear and binuclear metal ions such as those of nickel, cobalt, molybdenum, and other transition metals.

20 Claims, 6 Drawing Figures

PRIOR ART

CLASS OF HYDROPROCESSING CATALYSTS AND PREPARATION METHODS

THE FIELD OF THE INVENTION

This invention relates to hydroprocessing catalysts and, more particularly, to a new class of hydrocracking and hydrotreating catalysts and methods for their preparation wherein the catalysts consist of cross-linked smectites having catalytically active transition metal derivatives incorporated in their structure.

THE PRIOR ART

Smectites are a well-known class of naturally occurring swelling clays. Those smectites which can be used in the preparation of the new catalysts of this invention include montmorillonite, beidellite, hectorite, synthetic fluorhectorite and other members of the swelling smectite group. These smectites can be modified to form an expanded, porous framework when "pillars" are formed between the layers of the smectite. The resulting modified materials are referred to by some as cross-linked smectites (CLS) or by others as pillared interlayered clays (PILC). These CLS are characterized by fixed porosity and are fundamentally different from smectite systems obtained by conventional intercalation of neutral molecules in the interlamellar space. The cross-linking process involves interaction of the polyanionic smectite layers with di- or polycationic species derived from suitable organic or inorganic compounds.

As early as 1971, porous forms of montmorillonite, hectorite, and fluorhectorite were prepared by ion exchange with tetramethylammonium and ethylenediammonium cations. The products, however, had very small interlamellar spacings (3-4 A) and showed low resistance to swelling. Subsequently, cross-linked organo-smectite (CLOS) systems possessing larger interlayer spacings ($\Delta d(001) = 5$ A) and higher resistance to swelling were prepared by using di- or polycations derived from rigid or cage-like amines as cross-linking agents.

The first bona fide CLOS system of this type ($\Delta d(001) = 5.1$ A; lateral pore size, about 6.0 A) was prepared by ion exchange of Na-montmorillonite with the diammonium ion of 1.4-diazabicyclo[2,2,2]octane. The term $\Delta d(001)$ denotes the interlayer spacing in smectites, i.e., $\Delta d(001) = d(001) - t$, where $d(001)$ is the X-ray diffraction basal spacing and t is the thickness of the smectite unit layer. This system showed typical molecular sieve properties and high catalytic activity for esterification of carboxylic acids with alkanols. Products with larger $d(001)$ values were prepared by using bulkier cross-linking di- or tetracationic species derived from 1,4-diaminoadamantane, tetrakis (p-aminophenyl)methane, and 2,2',6,6'-substituted benzidines. A general feature of such CLOS systems is that simultaneous vertical attachment of cross-linking polycationic species to anionic sites of opposite aluminosilicate surfaces becomes requisite due to steric and electronic effects which exclude alternative orientation modes.

Important progress in the synthesis of CLS molecular sieves was achieved in previous art by cross-linking of smectites with fully inorganic, positively charged species, e.g., hydroxy-Al oligocations [Brindley, G. W. and Sempels, R. E. (1977) Preparation and properties of some hydroxy-alumininum beidellites: *Clay Miner.* 12, 229-236; Lahav, N., Shani, U., and Shabtai, J. (1978) Cross-linked smectites. I. Synthesis and properties of hydroxy-aluminum montmorillonite: *Clays & Clay Minerals* 26, 107-115; Vaughan, D. E. W., Lussier, R. J., and Magee, J. S. (1979) Pillared interlayered clay materials useful as catalysts and sorbents: U.S. Pat. No. 4,176,090, 1979; Shabtai, J. and Lahav, N. (1980) Cross-linked montmorillonite molecular sieves: U.S. Pat. No. 4,238,364, 1980; Vaughan, D. E. W., Lussier, R. J., and Magee, J. S. (1981) Stabilized pillared interlayered clays: U.S. Pat. No. 4,248,739, 1981; Vaughan, D. E. W., Lussier, R. J., and Magee, J. S. (1981b) Pillared interlayered clay products: U.S. Pat. No. 4,271,043, 1980; Brindley, G. W. and Kao, Chih-Chun (1980) Formation, composition and properties of hydroxy-Al- and hydroxy-Mg-montmorillonite: *Clays & Clay Minerals* 28, 435-442], or tetrameric hydroxy-Zr cations (Yamanaka, S. and Brindley, G. W. (1979) High surface area solids obtained by reaction of montmorillonite with zirconyl chloride: *Clays & Clay Minerals* 27, 119-124).

The cross-linked products showed high thermal stability, considerable surface areas, and intrinsic catalytic activity. When properly functionalized, such CLS molecular sieve catalysts showed increased activity and selectivity for certain types of reactions. For example, acidic ($H^+$, $La^{3+}$, and $Ce^{3+}$) forms of cross-linked montmorillonite showed high catalytic cracking activity (Shabtai, J. (1980) A new class of cracking catalysts—acidic forms of cross-linked smectites: U.S. Pat. No. 4,238,364, 1980; Shabtai, J., Lazar, R., and Oblad, A. G. (1981) Acidic forms of cross-linked smectites—a novel type of cracking catalysts: in *Proc. 7th Internat. Congress Catal.* Tokyo, 1980, T. Seiyama and K. Tanabe, eds., Kondansha-Elsevier, Tokyo, 828-837).

FIG. 1 is a schematic illustration of a prior art CLS catalyst disclosed and claimed in U.S. Pat. No. 4,238,364 issued Dec. 9, 1980 of which one of the coinventors of this invention was the inventor. With reference to FIG. 1, the drawing represents a schematic view of a cross-linked hydroxy-aluminum montmorillonite catalyst, designated as M—Al—CLM, wherein M represents an acidic ion. The schematic drawing describes a CLS cracking catalyst wherein A is a montmorillonite unit layer; B = internal surface; C = oligomeric hydroxy-aluminum cross-linking unit; D = interlayer spacing, $\Delta d(001)$; E = lateral (interpillar) distance: and $M^+ = H^+$ or $RE^{3+}$ ions. It will be noted that this prior art patent teaches a CLS framework material functionalized with acidic ions selected from the group consisting of the ions of hydrogen and/or rare-earth elements such as $Ce^{3+}$ or $La^{3+}$. Further, the pore system in the CLS framework is defined by a uniform interlayer distance of about 9-10 A, and a lateral (interpillar) distance which can be regulated to different values in the approximate range of 11-35 A.

Cross-linked smectites have been shown to be useful as cracking catalysts (Shabtai, J. and Lahav, N. (1980) Cross-linked montmorillonite molecular sieves: U.S. Pat. No. 4,238,364, 1980, 5 pp.; Shabtai, J. (1980) A new class of cracking catalysts—acidic forms of cross-linked smectites: U.S. Pat. No. 4,238,364, 1980, 5 pp).

A cross-linked smectite material prepared by cross-linking of $Na^+$-montmorillonite with hydroxy-Al oligocations has been characterized by pyridine adsorption, infrared spectroscopy, differential scanning calorimetric analysis, and catalytic activity testing for cracking of gas oils (Occelli, M. L. and Tindwa, R. M. (1983) Physiochemical properties of montmorillonite interlayered with cationic oxyaluminum pillars: *Clays & Clay Minerals,* 31, 22–28). In another recent study, a series of catalysts derived by partial cross-linking of $Ce^{3+}$-and $La^{3+}$-exchanged montmorillonites with hydroxy-Al oligocations were characterized by transmission electron microscopy, acidity measurements, determination of the relative concentrations of Bronsted and Lewis acid sites by photoacoustic infrared analysis, determination of the distribution of critical pore sizes by adsorption of polycyclic aromatic compounds, and catalytic activity for cracking of bulky naphthenoaromatic compounds (Shabtai, J., Massoth, F. E., Tokarz, M., Tsai, G. M. and McCauley, J., (1984) Characterization and molecular shape selectivity of cross-linked montmorillonite (CLM) catalysts: in *Proc. 8th Internat. Congress Catal.* Berlin, 1984, Vol. IV, 735–745). It was demonstrated in this study that cross-linked smectite catalysts possess critical pore sizes in the approximate range of 11 to 30 A, which are considerably larger than the typical pore sizes in the approximate range of 3 to 9 A found in zeolite catalysts. As a consequence of this fundamental difference in critical pore sizes, it has been found that acidic cross-linked smectite catalysts are markedly more active than conventional REY-type zeolites as catalysts for cracking of bulky hydrocarbon molecules having kinetic diameters larger than 10 A, such as found in heavy oil fractions (McCauley, J. (1983) Catalytic cracking properties of cross-linked montmorillonite (CLM) molecular sieves. M. Sc. Thesis, University of Utah, Salt Lake City, Utah, 1–103). Such bulky molecules cannot penetrate the intracrystalline pore system of zeolites but easily penetrate and diffuse in the interlamellar porous system of cross-linked smectites (Shabtai, J., Massoth, F. E., Tokarz, M., Tsai, G. M. and McCauley, J., (1984) Characterization and molecular shape selectivity of cross-linked montmorillonite (CLM) catalysts: in *Proc. 8th Internat. Congress Catal.* Berlin, 1984, Vol. IV, 735–745).

Another prior art catalyst consists of a Ni-containing mica-montmorillonite, prepared by hydrothermal synthesis [J. J. Heinerman, I. L. C. Freriks, J. Gaaf, G. T., Pott, and J. G. F. Coolegem, *J. Catal.,* 80, 145 (1983), and references therein; W. T. Granquist, U.S. Pat. Nos. 3,852,405 (1974), 3,929,622 (1975), and 3,976,744 (1976); K. H. Robschaller, C. A. Emeis, and R. A. van Santen, *J. Catal.,* 86, 1 (1984)]. The synthetic catalyst, designated as Ni-SMM, is a non-pillared aluminosilicate system, which in the non-reduced state contains $Ni^{2+}$ (substituted for $Al^{3+}$) in the octahedral layer of the structural units (FIG. 2A). The non-reduced Ni-SMM shows very low catlytic activity since the $Ni^{2+}$ is predominantly inside the layers and is not exposed at the outer or interlamellar surface of the mica-montmorillonite. Reduction of the Ni-SMM with hydrogen at a temperature in the range of 343°–450° C. yields catalysts showing good activity for hydroisomerization of n-pentane into isopentane. It was found (J. J. Heinerman, et al., loc. cited) that reduction results in the formation of metallic ($Ni^0$) crystallites and protons part of which probably migrate to the edges of the mica-montmorillonite layer units (FIG. 2B) with consequent generations of catalytic activity. The reduction is promoted by introducing some Pd in the Ni-SMM system, whereas the heat treatment accompanying the reduction causes partial collapse and destruction of the SMM structure. There was no indication of any catalytic activity due to the interlamellar surface of Ni-SMM in the reduced or the non-reduced state.

FIG. 2: Schematic view of a Ni-SMM system (a=mica-montmorillonite unit layer; b=interlamellar space; and $M^+$=exhangeable interlamellar ion): (A) Non-reduced system, where $Ni^{2+}=Ni^{2+}$ ions in octahedral positions; (B) Reduced system, where $Ni^0$=metallic nickel cyrstallites at the unit layer edges; and $H^+$=protons produced by reduction of $Ni^{2+}$ with hydrogen and/or by other reactions.

In view of the foregoing, it would be an advancement in the art to provide new types of hydroprocessing catalysts having high porosity, high thermal stability, and incorporated essential components having different catalytically active transition metal derivatives such as hydroxy-M or sulfhydryl-M oligomers or oligomeric cations (where M=molybdenum, chromium, nickel, cobalt, tungsten or other transition metals) and/or simple (mono- or binuclear) transition metal ions such as those of nickel, cobalt, molybdenum, chromium and other transition metals. It would also be a particularly significant advancement in the art to provide a CLS catalyst wherein different combinations of the foregoing transition metal compounds and/or ions are incorporated inside the interlamellar space of a cross-linked smectite. Advantageously, it would be a significant advancement in the art to incorporate the foregoing in a CLS that is highly porous and has a predominant lateral pore size in the range of 11 A to 35 A and surface area in the range of 200–600 square meters per gram of material. It would be a further advancement in the art to provide a CLS catalyst that is a stable at temperatures up to 700° C. Such a novel class of catalysts and the methods for their preparation are disclosed and claimed herein.

BRIEF SUMMARY AND OBJECTS OF THE INVENTION

This invention relates to novel hydroprocessing catalysts and methods for preparation of the same. The catalysts include a highly porous, CLS framework which is prepared from a smectite from the swelling smectite group that has been cross-linked with appropriate oligomeric compounds.

Catalytic activity is provided by incorporating essential components consisting of different catalytically active transition metal derivatives or combinations thereof, such as hydroxy-M or sulfhydryl-M oligomers or oligomeric cations (where M is one or different combinations of molybdenum, chromium, nickel, cobalt, tungsten or other transition metal) and/or simple mono- or binuclear transition metal ions such as those of nickel, cobalt, molybdenum, chromium or other transition metals. A characteristic feature of the catalysts of this invention is that they contain different combinations of these transition metal compounds and/or ions, and that these compounds and/or ions are incorporated inside the interlamellar space of the CLS. The CLS framework is highly porous with a predominant lateral pore size in the range of 11 A to 35 A and a surface area in the range of 200–700 square meters per gram of material. The catalysts are stable at temperatures up to 700° C. and they possess high intrinsic acidity. Advantageously, the catalysts of this invention possess high activity for hydrotreatment and/or hydrocracking of organic molecules present in heavy petroleum fractions, synthetic fuels, and other heavy oils. Of particular advantage is the high catalytic activity of the catalysts of this invention for bulky organic molecules (kinetic diameters, 10

A–30 A). These catalysts may be employed as such or incorporated as a component in a catalyst system.

It is, therefore, a primary object of this invention to provide a major improvement in the method for preparing hydroprocessing catalysts.

It is another object of this invention to provide a hydroprocessing catalyst wherein the catalyst framework is provided by a cross-linked smectite having a highly porous structure with a lateral pore size in the range of 11 A to 35 A, suitable for intrasorption and reaction of bulky organic molecules having kinetic diameters in the range of 10 A to 30 A.

Another object of this invention is to provide a catalyst having a surface area in the range of of 200–700 square meters per gram of material.

Another object of this invention is to provide a CLS catalyst having essential incorporated components of different catalytically active transition metal derivatives, such as hydroxy-M or sulfhydryl-M oligomers or oligomeric cations (where M is one or more of molybdenum, chromium, nickel, cobalt or tungsten or other transition metal and/or simple (mono- or binuclear) transition metal ions such as those of nickel, cobalt, molybdenum, chromium, and other transition metals).

Another object of this invention is to provide the CLS catalyst of this invention wherein the foregoing transition metal compounds and/or ions are incorporated in different combinations inside the interlamellar space of the CLS.

These and other objects and features of the present invention will become more fully apparent from the following description and appended claims taken in conjunction with the accompanying drawings.

DETAILED DESCRIPTION OF THE PREFERRED EMBODIMENTS

The invention is best understood by reference to the drawings and the accompanying text.

It is an essential feature of the catalysts of this invention that they have a structural backbone (skeleton) consisting of a porous cross-linked smectite (clay) such as cross-linked montmorillonite, cross-linked beidellite, cross-linked fluorhectorite, or cross-linked forms of other members of the smectite mineral group.

Figure 1:
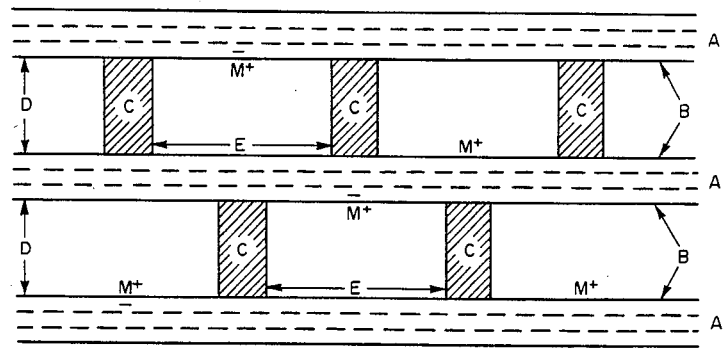
Figure 2A:
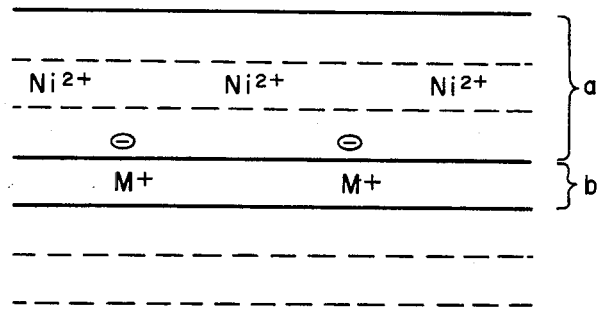
Figure 2B:
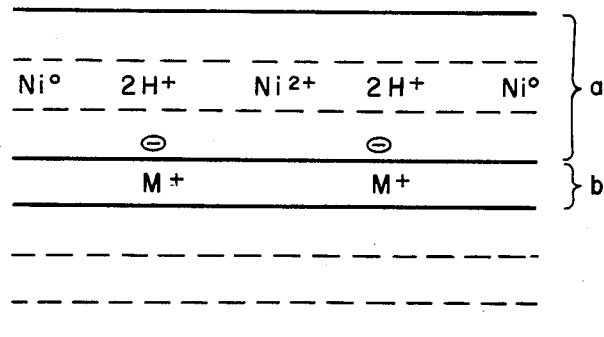
Figure 3:
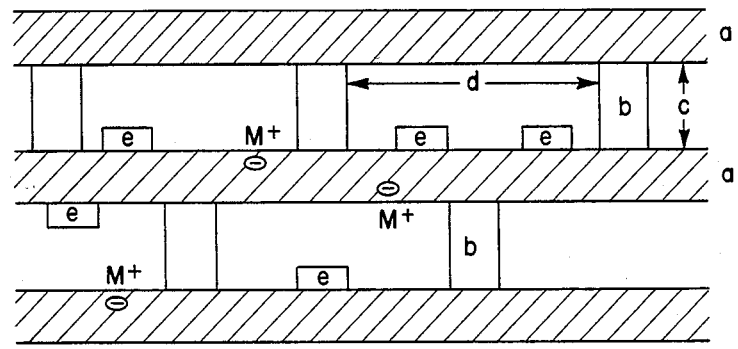
Figure 4:
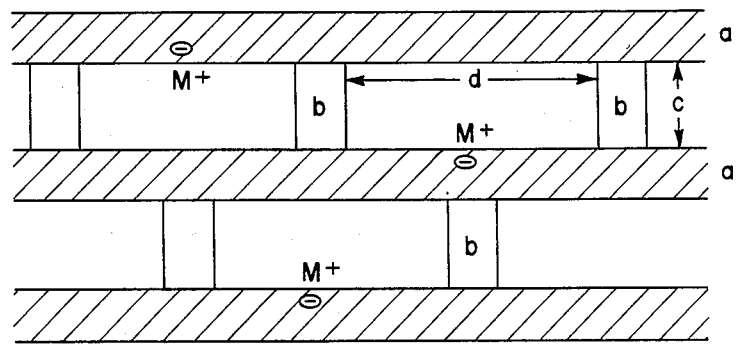
Figure 5:
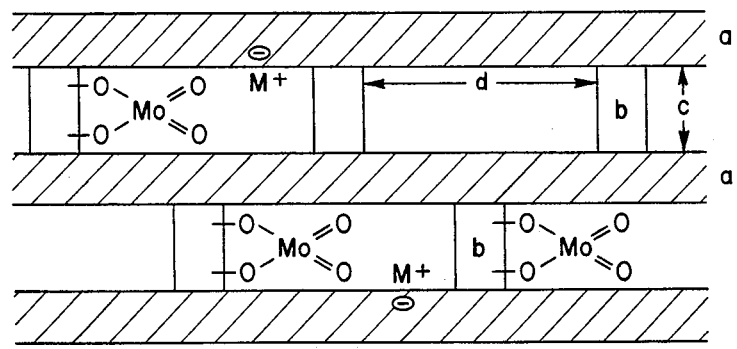

It is another essential feature of the catalysts of this invention that they contain, as incorporated components, different combinations of catalytically active transition metal derivatives possessing high hydrogenolytic and/or hydrogenation activity, such as in particular oxygen and/or sulfur-containing oligomers and/or oligomeric cations, and/or simple or complex cations of Mo, Cr, Ni, Co, W, and other transition metals. It is a specific feature of the catalysts of this invention that the hydrogenolysis- and/or hydrogenation-active components, described in the preceding sentence, are permanently incorporated in the catalysts of this invention (a) in the form of immobilized cross-links in a cross-linked smectite; and/or (b) in the form of oligomers, and/or oligomeric ions and/or simple ions, and/or complex ions, intercalated in the interlamellar space of a cross-linked smectite. FIGS. 3, 4, and 5 show schematically the structures of several forms of the catalysts of this invention [a=smectite unit layer; b=cross-linking component; c=interlayer spacing; d=lateral (inter-pillar) spacing].

FIG. 3 describes the structure of a hydrocracking and/or hydrotreatment catalyst of this invention consisting of a smectite cross-linked by means of hydroxy-Al oligomers or oligocations (b), and hydrogenolysis- and/or hydrogenation-active oligomeric components (e) intercalated in the interlamellar space.

FIG. 3: Schematic view of a hydrocracking and/or hydrotreatment catalyst having a cross-linked (pillared) structure and containing catalytically active oligomeric components intercalated in the interlamellar space between the cross links [e=intercalated hydroxy-M or sulfhydryl-M oligomers or oligomeric cations, where M=Mo, Cr, Ni, Co, W or various combinations of these transition metals; b=hydroxy-Al oligomers or oligomeric cations; $M^+$ =exchangeable metallic ion or $H^+$].

Catalysts of the type schematically shown in FIG. 3 are prepared by a two-step procedure, as follows.

Step 1. Low molecular weight hydroxy-M oligomers, where M=Ni, Co, Cr, Mo, or other transition metal, are prepared under mildly acidic conditions (pH in the range of 2.5 to 6) and introduced in the interlamellar space of the smectite, yielding intermediate intercalation products with low d(001) values, i.e., about 12 A–15 A.

Step 2. The intermediate product obtained in Step 1 is subjected to cross-linking (pillaring) with hydroxy-Al oligocations producing a well-propped CLS system, which has d(001) in the range of 17.5 to 20 A and which retains in its interlamellar space a major part of the catalytically active lower oligocations introduced in Step 1.

Details on the above preparation procedure are provided in Examples 1–7.

In a slightly modified step 1 of the above procedure, the low molecular weight hydroxy-M oligomers are incorporated in the interlamellar space of the smectite by intercalation of M halides, where M=Ni, Co, Cr, Mo or other transition metal, followed by titration with an aqueous NaOH solution and consequent in-situ hydrolysis of the M halides to catalytically active hydroxy-M oligomers. Details on this modified step 1 of the procedure are given in Examples 8 and 9.

FIG. 4 describes the structure of a hydrocracking and/or hydrotreatment catalyst of this invention consisting of a smectite pillared by means of cross-links which possess high hydrogenolytic and/or hydrogenation activity. The catalyst exhibits intrinsic acidity associated with acidic sites on the internal smectite surface or on the surface of the cross-links or on both surfaces.

FIG. 4: Schematic view of a hydrocracking and/or hydrotreatment catalyst having a cross-linked (pillared) smectite structure and containing catalytically active cross-links [cross-linking component b=hydroxy-M and/or sulfhydryl-M oligomers or oligomeric cations (where M=Cr, Ni, Co, Mo, W, or different combinations of these transition metals) alone or in combination with hydroxy-Al oligomers or oligomeric cations; $M^+$ =exchangeable metallic cations and/or $H^+$].

Hydroprocessing catalysts of the type schematically shown in FIG. 4 are preferably prepared by cross-linking of smectites with catalytically active mixed oligomers containing in addition to aluminum, one or more transition metals. The preferred mixed oligomers are hydroxy-MAl oligomeric cations, where M=Ni, or Co, or Cr, or other transition metal, or different combinations of these metals. The preparation of the catalysts is performed by two alternative procedures, as follows:

Procedure A

Addition of one or more transition metal ions, such as $Ni^{2+}$ or $Cr^{3+}$, or other transition metal ions, to pre-formed and aged hydroxy-Al oligomers, followed by cross-linking of a selected smectite, such as montmorillonite, with the resulting mixed hydroxy-MAl oligomers, such as hydroxy-NiAl, or hydroxy-CrAl oligomers.

Details on the preparation of a hydroprocessing catalyst of the type shown in FIG. 4, using the above procedure A are given in Example 10.

Procedure B

Simultaneous hydrolysis of a mixture of AlCl$_3$ and one or more transition metal halides, such as NiCl$_2$ or CrCl$_3$, with an aqueous NaOH solution, followed by cross-linking of a selected smectite, such as montmorillonite, with the resulting hydroxy-MAl oligomers such as hydroxy-NiAl, or hydroxy-CrAl oligomers.

Details on the preparation of catalysts of the type shown in FIG. 4, using the above procedure B, are provided in Examples 11–13.

In a modification of procedure B, the mixed hydroxy-MAl oligomers, where M=Ni, Co, Cr, or other transition metal, are subjected to hydrothermal aging at temperatures in the range of 100° to 200° C., prior to their use as cross-linking agents. This modified procedure B is used for preparation of hydroprocessing catalysts of the type schematically shown in FIG. 4, applying as cross-linking components not only mixed hydroxy-MAl oligomers, where M=Cr, Ni, Co, Mo, W, or different combinations of these transition metals, but also hydroxy-M oligomers which do not contain Al, such as hydroxy-Cr oligomers.

FIG. 5 describes schematically the structure of another form of a hydrocracking and/or hydrotreatment catalyst of this invention consisting of a smectite cross-linked with hydroxy-Al oligomers or oligocations, with Mo oxide mounted (superimposed) on the hydroxy-Al cross-links. In addition, this catalyst form contains catalytically active interlamellar cations, in particular $Ni^{2+}$, and/or $Co^{2+}$, and/or $H^+$ [b=hydroxy-Al oligomers or oligomeric cations; $M^+ = Ni^{2+}$ or $Co^{2+}$ or other transition metal and/or $H^+$].

Preparation of hydroprocessing catalysts of the type schematically shown in FIG. 5 is performed using a stepwise procedure as follows:

Step 1. The starting smectite is subjected to ion-exchange with a transition metal ion, in particular $Ni^{2+}$ or $Co^{2+}$. Partial ion exchange with acidic ions, e.g. $Ce^{3+}$, $La^{3+}$, $NH_4^+$ ($H^+$), is also done in some preparations to increase the acidity of the ion-exchanged smectite.

Step 2. The ion-exchanged smectite, such as Ni-montmorillonite or Co-montmorillonite, are subjected to cross-linking with aged hydroxy-Al oligomers to form a cross-linked product, designated as M—Al—CLS (where M is preferentially $Ni^{2+}$ or $Co^{2+}$; Al=hydroxy-Al oligomers; and CLS=cross-linked smectite).

Step 3. The M-Al-CLS product from step 2 is subjected to calcination at 400°–450° C. to partially dehydrate and thermally stabilize the hydroxy-Al cross-links.

Step 4. The calcined M-Al-CLS product from Step 3 is treated with an aqueous ammonium molybdate solution resulting in chemisorption (mounting) of Mo oxide on the hydroxy-Al pillars and, to a minor extent, on aluminol groups present at the edges of the smectite layers. The final, catalytically active product is designated as MMo—Al—CLS, where M is preferentially $Ni^{2+}$ or $Co^{2+}$; Mo=Mo oxide mounted on the hydroxy-Al cross-links; Al=hydroxy-Al oligomeric cross-links; and CLS=cross-linked smectite.

Details on the preparation of catalysts of the type described in FIG. 5 are given in Examples 14 and 15.

All of the catalyst products of this invention, such as those shown in FIGS. 3–5, are subjected to sulfidation with a H$_2$S-hydrogen mixture, prior to their use as hydroprocessing catalysts. Details on the sulfidation procedure are provided in Example 1.

As illustrated in FIGS. 3–5 by way of review, there are several important and characteristic features and advantages of the catalysts of this invention:

1. They contain different combinations of transition metal compounds and/or ions, in particular those of Mo, Cr, Ni, Co, and W, which are incorporated in different forms inside the interlamellar space of a cross-linked smectite and possess high hydrogenolytic and/or hydrogenation activity;

2. They are highly porous and have surface areas in the range of 200–700 square meters per gram of catalyst;

3. They have fixed basal spacings in the range of 17.0 to 25.0 A and lateral pore sizes in the range of 11 to 35 A;

4. The lateral pore sizes of the catalysts can be adjusted to a desirable predominant value in the range of 11 to 35 A as a function of the extent of cross-linking used in the preparation of the cross-linked smectite skeleton of the catalysts, and/or as a function of the charge density of the starting smectite;

5. Their lateral pore sizes in the range of 11 to 35 A are sufficiently large to allow for penetration and diffusion of bulky organic molecules (kinetic diameters, about 10 to 25 A) inside the interlamellar pore systems of the catalysts;

6. They possess a greatly advantageous property, when compared with zeolite catalysts, that their pore sizes allow for penetration and diffusion of bulky organic molecules (kinetic diameters, about 10 to 25 A), which cannot penetrate the narrow intracrystalline pores (critical diameters, 3–9 A) of conventional molecular sieve zeolites;

7. They exhibit a greatly advantageous property, when compared with conventional supported catalysts, in that their pores have lateral dimensions similar to the molecular dimensions of bulky organic molecules, and as a result the catalysts of this invention exert a strongly activating molecular sieve effect upon bulky organic molecules adsorbed inside their interlamellar pore system. No such augmented activation effect exists in the case of reactant molecules adsorbed on conventional hydrocracking and/or hydrotreatment catalysts supported on macroporous materials such as alumina, silica-alumina, and other metal oxides;

8. They are stable at high temperatures in the range of 300°–700° C.;

9. They possess high intrinsic acidity which can be augmented by incorporating interlamellar acidic ions and/or groups, such as $H^+$, $Ce^{3+}$, $La^{3+}$, and/or acidic Si-OH groups, in the functionalized CLS catalyst.

10. The absolute concentrations of the different catalytically active transition metal compounds and/or ions, in particular those of Mo, Cr, Ni, Co, and W, incorporated in the cross-linked smectite structure, are in the range of 0.1 to 15% by weight, while their relative concentrations can be easily varied to different desirable levels, as illustrated in the Examples;

11. They show high hydrocracking and/or hydrotreatment activity even at low concentrations of their active components, such as incorporated ions and/or compounds of Mo, Ni, Co, Cr and W;

12. They preferentially contain total concentrations of active transition metal components, such as Mo, Ni, Co, Cr and W, in the range of 0.1 to 12% by weight, which are lower than the total concentrations of active components in conventional hydroprocessing catalysts;

13. They possess high activity for hydrocracking and/or hydrotreatment of bulky organic molecules present in heavy petroleum fractions, synthetic fuels and other heavy oils.

Following are nonlimiting examples which provide data on the preparation, composition, properties, and hydrocracking and/or hydrotreating activities of the catalysts of this invention.

EXAMPLES

Example 1

A catalyst designated as OH—NiCrMo—Al—CLM-135 (where OH—NiCrMo denotes interlamellar hydroxy-NiCrMo oligomers; Al=oligomeric hydroxy-Al cross-links; CLM=cross-linked montmorillonite; and 135 is the sample number) was prepared by a two-step procedure, as follows. In step 1 of the preparation, 120 ml of a mixture, consisting of 40 ml each of 0.1M aqueous $NiCl_2$, $CrCl_3$, and $MoCl_5$ solutions, and 300 ml of a 0.1M aqueous NaOH solution, were simultaneously added dropwise and with constant stirring to a dispersion of 10 g of NaCa-montmorillonite in 500 ml of water. The resulting dispersion was left to stand overnight and the solid product, consisting of NaCa-montmorillonite intercalated with hydroxy-NiCrMo oligomers, was centrifuged, washed until chloride-free and freeze-dried. This intermediate product showed a basal X-ray diffraction spacing of 12.99 A, and contained (% by weight) 51.5 $SiO_2$, 20.41 $Al_2O_3$, 1.75 Ni, 1.47 Cr, and 2.28 Mo.

In step 2, an amount of 7 g of the product from Step 1 was redispersed in water and subjected to cross-linking with 175 ml of an oligomeric hydroxy-Al solution, aged for a period of 2 weeks at room temperature, and having a concentration of 60 mmol Al/liter. This corresponded to a ratio of 1.5 mmol Al/gram of OH-NiCrMo-intercalated smectite. The cross-linking reaction was performed by adding the above oligomeric hydroxy-Al solution to the dispersion of the intercalated smectite at 25° C. at a feed rate of 120 ml/hour, using a calibrated tubing pump. The product dispersion was left overnight and the solid, cross-linked product was then filtered, washed with deionized water and freeze-dried. This final OH—NiCrMP—Al—CLM-135 product contained (% by weight) 52.60 $SiO_2$, 25.89 $Al_2O_3$, 1.05 Ni, 1.39 Cr, and 2.1 Mo. The basal X-ray powder diffraction spacing of the product was 18.78 A.

The catalytic hydrocracking activity of a sample of OH—NiCrMo—Al—CLM-135 was examined using n-dodecane as feedstock. The catalyst was sulfided prior to its use with a 9% $H_2S$ in hydrogen mixture at 350° C. for a period of 2 hours. The following activity testing procedure was used:

40 ml of pure grade (>99 mol ) n-dodecane, 0.4 g of sulfided catalyst, and 3-4 drops of carbon disulfide were charged into a 300 ml stirred autoclave. The latter was sequentially purged with nitrogen and hydrogen and then pressurized with hydrogen to 2000 psig. The autoclave was heated up to 350° C. within 50 minutes, and then stirred at this temperature for 2 hours. Subsequently, the autoclave was cooled down and depressurized. The product was removed and analyzed by gas chromatography. The yield of hydrocracking products, consisting almost exclusively of $C_5$-$C_8$ saturated hydrocarbons, was 75.5% by weight.

Example 2

A catalyst designated as OH—NiCrMo—Al—CLM-136 was prepared according to the procedure used in Example 1, except that the cross-linked product was redispersed in water and subjected to a second cross-linking treatment. The repeated cross-linking was performed under otherwise identical conditions as used in the cross-linking step 2 described in Example 1, and resulted in a final product containing (% by weight) 51.80 $SiO_2$, 26.65 $Al_2O_3$, 0.97 Ni, 1.38 Cr, and 2.01 Mo. This catalyst (OH—NiCrMo—Al—CLM-136) showed a basal spacing of 18.78 A, which remained essentially unaffected by heat treatment in the temperature range of 400°-600° C. A total yield of 80.2% of $C_5$-$C_8$ hydrocarbon products was obtained with this catalyst in hydrocracking activity testing with n-dodecane as feed, using the same procedure as in Example 1.

Example 3

A catalyst, designated as OH—NiCrMo—Al-126, was prepared by the same two-step procedure described in Example 1, except that a lower weight ratio of the hydroxy-NiCrMo oligomers to starting smectite, and a more dilute smectite dispersion, were used. In step 1 of the preparation, 90 ml of a mixture, consisting of 30 ml each 0.1M aqueous $NiCl_2$, $CrCl_3$, and $MoCl_5$ solutions, and 250 ml of a 0.1M aqueous NaOH solution were simultaneously added dropwise and with constant stirring to a dispersion of 10 g of NaCa-montmorillonite in 1 liter of water. The resulting dispersion of the intercalated smectite was left overnight and then centrifuged, washed and freeze-dried. In step 2 of the preparation, the intercalated smectite product from step 1 was cross-linked with a 2-weeks' old oligomeric hydroxy-Al solution, using a ratio of 1.5 mmol Al/gram of intercalated smectite and applying the same procedure as in Example 1. The final, cross-linked catalyst product (OH—NiCrMo—Al-126) showed d(001)=18.2 A, and contained (% by weight) 1.06 Ni, 1.37 Cr, and 0.74 Mo. A yield of 63.4% of $C_5$-$C_8$ hydrocarbon products was obtained with this catalyst in hydrocracking activity testing, using the same procedure as in Example 1.

Example 4

A catalyst designated as OH—NiCrMo—Al—CLM-137 was prepared by the same two-step procedure described in Example 1, except that a higher weight ratio of hydroxy-NiCrMo oligomers to starting smectite was used. In step 1 of the preparation, 180 ml of a mixture consisting of 60 ml each of 0.1M aqueous $NiCl_2$, $CrCl_3$ and $MoCl_5$ solutions (molar ratio 1:1:1), and 450 ml of a 0.1M aqueous NaOH solution, were simultaneously added dropwise and with constant stirring to a dispersion of 10 g of NaCa-montmorillonite in 500 ml of water. The resulting dispersion was left overnight, and the solid product, consisting of montmorillonite intercalated with hydroxy-NiCrMo oligomers, was centrifuged, washed, and freeze-dried.

In step 2, the intermediate product from step 1 was subjected to cross-linking with an oligomeric hydroxy-Al solution using the same procedure and conditions given in Example 1. A ratio of 1.5 mmol Al/gram of OH—NiCrMo-intercalated smectite was used. The cross-linked OH—NiCrMo—Al—CLM-137 catalyst product showed d(001)=17.5 A, and contained (% by weight) 1.69 Ni, 2.23 Cr, and 3.59 Mo. The surface area of the catalyst was 470 m$^2$/g. A total yield of 88.6% of $C_5$–$C_8$ hydrocarbon products was obtained with this catalyst in hydrocracking activity testing with n-dodecane as feed, using the same procedure as in Example 1.

Example 5

A catalyst designated as OH-NiCrMo-Al-144 was prepared using the same procedure described in Examples 1 and 4, except that the relative amounts of the 0.1M aqueous $NiCl_2$, $CrCl_3$ and $MoCl_5$ solutions, used in step 1 were changed to a molar ratio of 2:3:2, respectively. In step 1 of the preparation, 140 ml of a solution consisting of 40 ml of 0.1M aqueous $NiCl_2$, 60 ml of 0.1M aqueous $CrCl_3$, and 40 ml of 0.1M aqueous $MoCl_5$ solutions, and 350 ml of a 0.1M aqueous NaOH solution were simultaneously added dropwise and with stirring to a dispersion of 10 g of NaCa-montmorillonite in 500 ml of water. The resulting intermediate product, consisting of montmorillonite intercalated with hydroxy-NiCrMo oligomers was then subjected to cross-linking with an oligomeric hydroxy-Al solution using an identical procedure as in Example 1. A ratio of 1.5 mmol Al/gram of OH—NiCrMo-intercalated smectite was used in this cross-linking step 2. The final OH—NiCrMo=Al—CLM-144 catalyst showed d(001)=18.1 A and contained (% by weight) 1.27 Ni, 3.01 Cr, and 3.19 Mo. A total yield of 92.6% of $C_5$–$C_8$ hydrocarbon products was obtained with this catalyst in hydrocracking activity testing with n-dodecane as feed, using the same procedure as in Example 1.

Example 6

A catalyst designated as OH-NiCrMo-Al-CLM-146 was prepared using the same procedure described in Example 1, except that the relative amounts of the 0.1M aqueous $NiCl_2$, $CrCl_3$ and $MoCl_5$ solutions used in step 1 were changed to a molar ratio of 1:1:2. In step 1 of the catalyst preparation were used (a) 160 ml of a mixture consisting of 40 ml of 0.1M aqueous $NiCl_2$, 40 ml of 0.1M aqueous $CrCl_3$, and 80 ml of 0.1M aqueous $MoCl_5$ solutions, and (b) 400 ml of a 0.1M aqueous NaOH solution. Solutions (a) and (b) were added simultaneously to a dispersion of 10 g of NaCa-montmorillonite in 500 ml of water, over a period of 1.5 hours. The resulting intermediate product, consisting of montmorillonite intercalated with hydroxy-NiCrMo oligomers was then subjected to cross-linking with an oligomeric hydroxy-Al solution using an identical procedure as in Example 1. A ratio of 1.5 mmol Al/gram of OH—NiCrMo-intercalated smectite was used in this cross-linking step. The final OH—NiCrMo—Al—CLM-146 catalyst showed d(001)=18.6 A and contained (% by weight) 1.53 Ni, 1.63 Cr, and 4.32 Mo. A total yield of 83.6% of $C_5$–$C_8$ hydrocarbon products was obtained with this catalyst in hydrocracking activity testing with n-dodecane as feed, using the same procedure as in Example 1.

Example 7

A catalyst designated as OH—NiCrMo—Al—CLM-138 was prepared exactly according to the procedure described in Example 4 for preparation of catalyst OH—NiCrMo—Al—CLM-137, except that the cross-linked product obtained in step 2 was redispersed in water and subjected to repeated cross-linking with the oligomeric hydroxy-Al solution, using the same cross-linking procedure and conditions described in Example 1 (step 2). The final OH—NiCrMo—Al—CLM-138 catalyst, produced by the repeated cross-linking, showed d(001)=18.78 A, and contained (% by weight) 1.57 Ni, 2.15 Cr and 3.49 Mo. A total yield of 64.2% of $C_5$–$C_8$ hydrocarbon products was obtained with this catalyst in hydrocracking activity testing with n-dodecane as feed, using the same procedure as in Example 1. Repetition of the activity testing with the used catalyst for three additional runs (2 hr. each), using a fresh portion of n-dodecane in each run showed no detectable decline in the activity of the catalyst.

Example 8

A catalyst designated as OH—NiCrMo—Al—CLM-203 was prepared by the following two-step procedure which is a modification of the method given in Example 1:

In step 1 of the preparation, a mixture, consisting of 40 ml each of 0.1M aqueous $NiCl_2$, $CrCl_3$ and $MoCl_5$ solutions, was added to 10 g of NaCa-montmorillonite and stirred for 8 hours at room temperature. The resulting fine dispersion was titrated with 300 ml of a 0.1M aqueous NaOH solution, resulting in a final pH=5.1. The dispersion was aged for 1 day to allow for hydrolysis of the intercalated Ni, Cr and Mo chlorides, and was then centrifuged to separate the intermediate hydroxy-NiCrMo-montmorillonite product. In step 2 of the procedure this product was cross-linked with an oligomeric hydroxy-Al solution using a ratio of 1.5 mmol Al/gram of hydroxy-NiCrMo-montmorillonite and applying the same procedure as in Example 1.

The final OH—NiCrMo—Al—CLM-203 catalyst showed d(001)=18.1 A, and contained (% by weight) 0.38 Ni, 1.48 Cr, and 1.32 Mo. A yield of 76.3% of $C_5$–$C_8$ hydrocarbons was obtained with this catalyst in hydrocracking activity testing with n-dodecane as feed, using the procedure of Example 1.

Example 9

A catalyst designated as OH—NiCrMo—Al—CLM-210 was prepared exactly according to the procedure described in Example 8 for preparation of catalyst OH—NiCrMo—Al—CLM-203, except that the cross-linked product obtained in step 2 was redispersed in water and subjected to repeated cross-linking with the oligomeric hydroxy-Al solution, using the same procedure and cross-linking conditions described in Example 1 (step 2). The final OH—Ni—CrMo—Al—CLM-210 catalyst, produced by the repeated cross-linking, showed d(001) 19.1 A, and contained (% by weight) 0.36 Ni, 1.41 Cr, and 1.30 Mo. A yield of 74.1% of $C_5$–$C_8$ hydrocarbons was obtained with this catalyst in hydrocracking activity testing with n-dodecane as feed, using the same procedure given in Example 1. Repetition of the testing with the used catalyst for three additional runs (2 hr. each), using a fresh portion of n-dodecane reactant in each run, showed no decline in the activity of the catalyst.

Example 10

A catalyst designated as OH—NiAl—CLM-207 (where OH—NiAl denotes mixed hydroxy-NiAl oligomers incorporated as cross-links; and CLM=cross-linked montmorillonite) was prepared by cross-linking of montmorillonite with catalytically active, mixed hydroxy-NiAl oligomeric cations, using the following procedure:

Three reactant solutions were first prepared: (a) a 0.1M aqueous solution of $NiCl_2$ and $AlCl_3$ having a Ni/Al molar ratio of 2:1; (b) a 0.1M aqueous NaOH solution; and (c) an aqueous hydroxy-Al oligomeric solution, having a concentration of 0.1 mol of Al per liter and aged for 2 weeks at room temperature. 18 ml of solution (a), 31 ml of solution (b), and 60 ml of solution (c) were simultaneously added to an aqueous dispersion of 3 g of NaCa-montmorillonite in 300 ml of water causing fast cross-linking and attendant flocculation. The cross-linked product was filtered, washed with deionized water until chloride-free, and then freeze-dried. The final catalyst showed d(001)=18.2 A, and contained 0.7% by weight of Ni. The surface area of the catalyst was 338 $m^2/g$. A yield of 40.3% of $C_5$-$C_8$ hydrocarbons was obtained with this catalyst in hydrocracking activity testing with n-dodecane as feed, using the procedure of Example 1.

Example 11

A catalyst, designated as OH—NiAl—CLM-112, was prepared by cross-linking of montmorillonite with mixed hydroxy-NiAl oligomeric cations using the following procedure. Two solutions were first prepared, i.e., (a) a 0.1M aqueous solution of $NiCl_2$ and $AlCl_3$, having a Ni/Al ratio of 1:3; and (b) a 0.1M aqueous NaOH solution. An amount of 110 ml of solution (b) was added dropwise to 60 ml of solution (a) with constant stirring over a period of 1 hour. The final pH of the resulting clear solution was 5.0. This mixture was aged for 1 day at room temperature, and then for 1 hour at 90° C. to complete the simultaneous hydrolysis of the $NiCl_2$ and $AlCl_3$ and form the mixed hydroxy-NiAl oligocations.

The resulting hydroxy-NiAl oligomeric solution (reactant A) was then added dropwise over a period of 20 minutes to a dispersion containing 3 g of NaCa-montmorillonite in 300 ml of water (reactant B) causing fast cross-linking and attendant flocculation. The ratio of cross-linking agent (reactant A) to smectite (reactant B) was 2.0 mmol Ni+Al/gram of montmorillonite. The flocculated, cross-linked catalyst product was filtered, washed with deionized water and freeze-dried. This catalyst had a Ni content of 1.05% by weight and showed a basal spacing=18.39 A. The surface area of the catalyst was 320 $m^2/g$. A yield of 60.2% by weight of $C_5$-$C_8$ hydrocarbon products was obtained with this catalyst in hydrocracking activity testing with n-dodecane as feed, using the procedure of Example 1.

Example 12

A catalyst, designated as OH—CrAl—CLM-108, was prepared by cross-linking of montmorillonite with mixed hydroxy-CrAl oligomeric cations derived by simultaneous hydrolysis of a mixture of $CrCl_3$ and $AlCl_3$, using the following procedure.

Two solutions were first prepared: (a) a mixed solution of $CrCl_3$ and $AlCl_3$ having a total 0.2M concentration and a Cr/Al molar ratio of 9.0; and (b) a 0.2M aqueous NaOH solution. A portion of 120 ml of solution (b) was added dropwise and with constant stirring to 60 ml of solution (a) over a period of 1 hour. The resulting clear solution was aged for 3 hours at 80° C. and then aged for another 48 hours at room temperature. This aged hydroxy-CrAl oligomeric solution (reactant A) was then reacted with a dispersion containing 3 grams of NaCa-montmorillonite in 300 ml of water causing cross-linking and flocculation. The resulting cross-linked hydroxy-CrAl-montmorillonite product was filtered, washed and freeze-dried. The final catalyst product contained 1.48% by weight of Cr and showed a basal spacing of 17.9 A. A yield of 46.5% by weight of $C_5$-$C_8$ hydrocarbon products was obtained with this catalyst in hydrocracking activity testing with n-dodecane as feed, using the procedure of Example 1.

Example 13

A catalyst, designated as OH—Cr—CLM-117, was prepared by cross-linking of montmorillonite with hydrothermally aged hydroxy-Cr oligomeric cations. The following procedure was applied. Two solutions were first prepared: (a) an aqueous 0.1M $CrCl_3$ solution; and (b) an aqueous 0.1M NaOH solution. An amount of 40 ml of solution (b) was added dropwise and with constant stirring to 20 ml of solution (a) and the resulting clear solution, which had pH=4.5, was introduced in a 100 ml hydrothermal bomb and aged by heating at 120° C. for 24 hours. The resulting hydroxy-Cr oligomeric solution was then used as a cross-linking agent, i.e., it was added to a dispersion of 0.4 gram of NaCa-montmorillonite in 200 ml of deionized water causing fast flocculation. The floculated, cross-linked hydroxy-Cr montmorillonite catalyst product was separated by filtration, washed with deionized water, and freeze-dried. This catalyst contained 2.14% by weight of Cr and showed a very high basal spacing of 22.1 A.

Example 14

A catalyst, designated as NiMo—Al—CLM-175 (where Ni denotes $Ni^{2+}$ ions introduced by ion exchange in the interlamellar space of the smectite, Mo=Mo oxide mounted (chemisorbed) on hydroxy-Al oligomeric cross-links, Al=hydroxy-Al oligomeric cross-links, and CLM=cross-linked montmorillonite) was prepared by the following stepwise procedure:

Step 1. An amount of 10 grams of NaCa-montmorillonite was subjected to repetitive ion-exchange (3 exchanges; 24 hours each; at 80° C.) with 200 ml portions of an aqueous 0.1M $NiCl_2$ solution. The resulting Ni-montmorillonite was filtered, washed with deionized water until chloride-free, and freeze-dried. This intermediate product contained 2.91% by weight of Ni.

Step 2. The Ni-montmorillonite from Step 1 was redispersed in water and cross-linked with a hydroxy-Al oligomeric solution aged for two weeks at room temperature. A ratio of 1.6 mmol Al/gram of Ni-montmorillonite was used in this cross-linking step. The intermediate cross-linked product was filtered, washed and freeze-dried.

Step 3. The cross-linked, Ni—Al—CLM product from step 2 was next calcined at 450° C. for 3 hours under a flow of dry nitrogen.

Step 4. A 6 gram portion of the calcined Ni-—Al—CLM sample from step 3 was mixed at 25° C. with 240 ml of an aqueous 0.005M ammonium molybdate solution (pH=7.2) and left to stand for a period of 20 hours. The product formed was filtered, washed with deionized water and freeze-dried. This final catalyst product (NiMo—Al—CLM-175), having Mo oxide chemisorbed on the hydroxy-Al cross-links, contained 0.46% by weight of Ni and 0.52% by weight of Mo. The catalyst showed d(001)=17.3 A, and a surface area of 319 $m^2$/gram. An yield of 79.2% by weight of $C_5$-$C_8$ hydrocarbon products were obtained with this catalyst in hydrocracking activity testing with n-dodecane as feed, using the procedure of Example 1.

Example 15

A catalyst, designated as CoMo—Al—CLM-160 (where Co denotes $Co^{2+}$ ions introduced by ion exchange in the interlamellar space of the smectite, Mo = Mo oxide chemisorbed on hydroxy-Al cross-links, Al = hydroxy-Al oligomeric cross-links, and CLM = cross-linked montmorillonite), was prepared by a stepwise procedure identical with that used for the preparation of the NiMo—Al—CLM-175 catalyst of Example 14 except that an aqueous 0.1M $CoCl_2$ solution instead of the 0.1M $NiCl^2$ solution was used in the ion-exchange step 1, and consequently $Co^{2+}$ instead of $Ni^{2+}$ was incorporated as the interlamellar ion in the intermediate products of steps 2 and 3, and in the final catalyst product obtained in step 4. The final catalyst (CoMo—Al—CLM-160) contained 0.57% by weight of Co and 0.65% of Mo. The catalyst showed d(001) = 17.4 A, and a surface area of 305 $m^2$/gram. A yield of 45.8% of $C_5$-$C_8$ hydrocarbon products was obtained with this catalyst in hydrocracking activity testing with n-dodecane as feed, using the procedure of Example 1.

We claim:

1. A hydroprocessing catalyst possessing at least one activity of hydrocracking and hydrogenation, said catalyst comprising:
    a cross-linked smectite framework material prepared through interaction of the polyanionic smectite layers with oxygen-containing oligomeric cations, selected from the group of oligomeric hydroxy-metal cations and oxo-metal cations; and
    incorporated interlamellar components consisting of preselected combinations of catalytically active transition metal derivatives selected from the group consisting of Mo, Cr, Ni, Co, W and other transition metals, said transition metals being present in the form of metal derivatives selected from the group consisting of oxygen-containing oligomers and oligomeric cations, and cations selected from the group consisting of mononuclear cations and binuclear cations.

2. The hydroprocessing catalyst defined in claim 1 wherein the cross-linked smectite framework material comprises a cross-linked form of a smectite selected from the group consisting of cross-linked montmorillonite, cross-linked beidellite, cross-linked hectorite, cross-linked fluorhectorite, and a cross-linked form of any other member of the smectite mineral group.

3. The hydroprocessing catalyst defined in claim 1 wherein the catalytically active transition metal derivatives are intercalated in the interlamellar space of the cross-linked smectite in the form of oligomers, oligomeric cations, mononuclear ions and binuclear ions.

4. The hydroprocessing catalyst defined in claim 1 wherein the catalytically active transition metal derivatives are incorporated in the form of immobilized interlamellar cross-linking components or in the form of compounds or ions chemisorbed on said cross-linking components of the cross-linked smectite.

5. The hydroprocessing catalyst defined in claim 1, wherein the catalytically active transition metal derivatives are exclusively situated in different forms in the interlamellar space of the cross-linked smectite and are specifically characterized by not being incorporated in the basic structure of the smectite unit layers.

6. The hydroprocessing catalyst defined in claim 1 wherein the cross-linked smectite framework material is prepared with retention of the basic structure of the smectite unit layers.

7. The hydroprocessing catalyst defined in claim 1 wherein the cross-linked smectite framework material has basal spacings within the range on the order of about 17 A to 25 A and lateral, interpillar pore sizes within the range on the order of about 10 A to 35 A.

8. The hydroprocessing catalyst defined in claim 1 wherein the surface area of the catalyst is within the range on the order of about 200 to about 700 square meters/gram of catalyst.

9. The hydroprocessing catalyst defined in claim 1 wherein the catalyst is resistant to swelling in water and hydrocarbon solvents.

10. The hydroprocessing catalyst defined in claim 1 wherein the lateral pore size has been selectively adjusted to a desirable predominant value within the range on the order of about 10 A to 35 A by regulating the extent of cross-linking during the preparation of the catalyst.

11. The hydroprocessing catalyst defined in claim 1 wherein the catalyst is stable at temperatures within the range on the order of about 300° C. to 700° C.

12. The hydroprocessing catalyst defined in claim 1 wherein the total concentration of the catalytically active transition metals incorporated in the interlamellar space of the catalyst is within the range on the order of about 0.1% to 20% by weight.

13. The hydroprocessing catalyst defined in claim 1 wherein the relative concentrations of the interlamellar transition metal derivatives can be varied to different desirable levels within the range on the order of about 0.1% to about 15% by weight for each individual transition metal.

14. The hydroprocessing catalyst defined in claim 1 wherein the catalyst possesses high inherent acidity and which can be augmented by adding during the catalyst preparation at least one type of interlamellar acidic ions and acidic groups.

15. The hydroprocessing catalyst defined in claim 1 wherein the catalyst comprises a cross-linked hydroxy-aluminum montmorillonite containing as incorporated interlamellar components a mixture of catalytically active species selected from the group consisting of oxygen-containing oligomers and oligomeric cations of nickel, chromium, and molybdenum.

16. The hydroprocessing catalyst defined in claim 1, wherein the catalyst is sulfided with a mixture of hydrogen sulfide and hydrogen prior to its use in catalytic hydroprocessing.

17. A method for producing a hydroprocessing catalyst comprising:
    (a) preparing hydroxy-M oligomers and/or oligomeric cations, where M is selected from the group consisting of nickel, cobalt, chromium, molybdenum or other transition metal, under mildly acidic conditions (pH within the range on the order of about pH 2.5 to pH 6.0) and introducing those in the interlamellar space of a smectite, yielding an intermediate intercalation product with low basal spacing in the range of 12 A to 16 A; and
    (b) subjecting the intermediate product from step 1 to cross-linking with hydroxy-Al oligomers or oligomeric cations and thereby producing a well-propped cross-linked montmorillonite system which has a basal spacing in the range of 17.0 A to 20.0 A and which retains in its interlamellar space a major part of the catalytically active oligomers introduced in step (a).

18. A method for producing a hydroprocessing catalyst, comprising:
(a) adding transition metal ions, in particular $Ni^{2+}$ or $Cr^{3+}$ to pre-formed and aged hydroxy-Al oligomeric cations; and
(b) using the resulting mixed hydroxy-NiAl or hydroxy-CrAl oligomeric cations to cross-link a smectite, in particular montmorillonite, thereby introducing these oligomeric cations in the catalyst in the form of interlamellar cross-links.

19. A method for producing a hydroprocessing catalyst, comprising:
(a) simultaneously hydrolyzing a mixture of $AlCl_3$ and one or more transition metal halides, in particular $NiCl_2$, $CrCl_3$, and $MoCl_5$, with an aqueous NaOH solution; and
(b) cross-linking of a smectite with the resulting mixed hydroxy-MAl oligomers, where M is nickel, chromium and molybdenum and other transition metals.

20. A method for producing a hydroprocessing catalyst, comprising:
(a) ion-exchanging a smectite with a transition metal ion, in particular $Ni^{2+}$ or $Co^{2+}$;
(b) cross-linking the ion-exchanged smectite, in particular a Ni-smectite or Co-smectite, with aged hydroxy-Al oligomers or oligomeric cations to produce a cross-linked smectite retaining a major part of the $Ni^{2+}$ or $Co^{2+}$ ions introduced in step (a);
(c) calcining the $Ni^{2+}$- or $Co^{2+}$-containing cross-linked smectite produced in step (b) at 400°–500° C., and
(d) treating the calcined intermediate product from step (c) with an aqueous ammonium molybdate solution, resulting in chemisorption of molybdenum oxide on the hydroxy-Al cross-links and thereby yielding said hydroprocessing catalyst.

* * * * *